Figure 1:
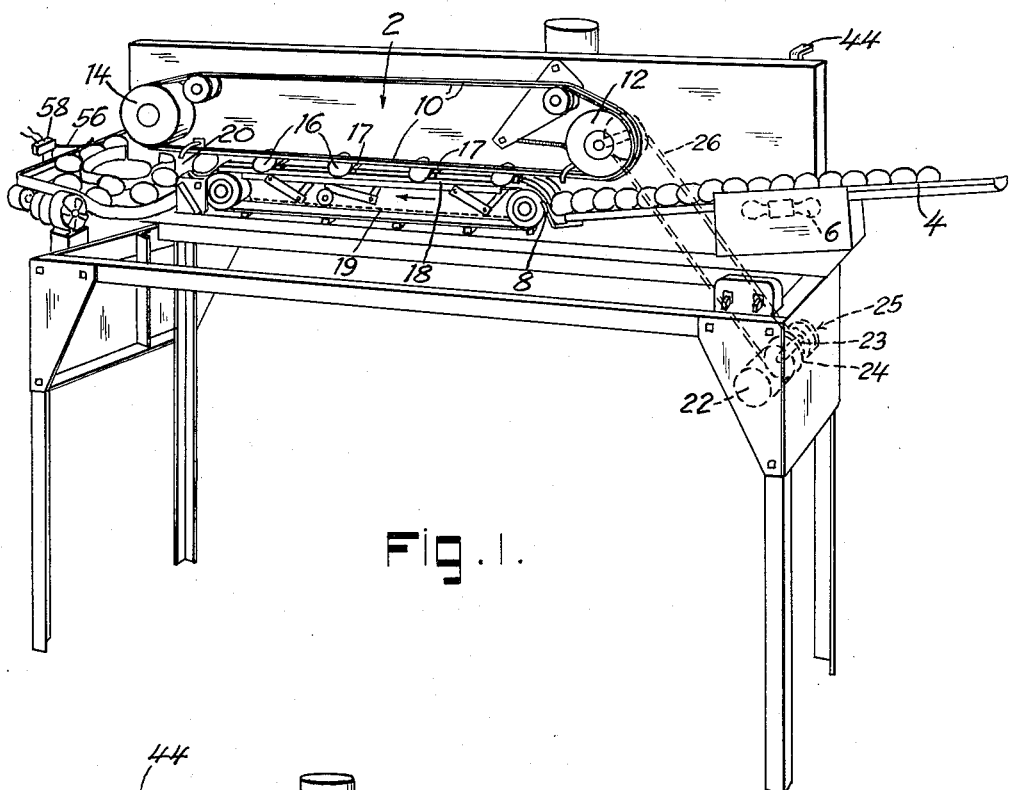

March 27, 1962 — O. C. NIEDERER ETAL — 3,027,008

EGG HANDLING EQUIPMENT

Filed Jan. 19, 1959 — 2 Sheets-Sheet 1

INVENTORS
OTTO C. NIEDERER.
BY HERBERT O. NIEDERER.
Albert S. Perry
ATTORNEY.

March 27, 1962   O. C. NIEDERER ETAL   3,027,008
EGG HANDLING EQUIPMENT

Filed Jan. 19, 1959   2 Sheets-Sheet 2

INVENTORS
OTTO C. NIEDERER
BY HERBERT O. NIEDERER
Albert Sperry
ATTORNEY.

United States Patent Office 3,027,008
Patented Mar. 27, 1962

3,027,008
EGG HANDLING EQUIPMENT
Otto C. Niederer, Bear Tavern Road, and Herbert O. Niederer, Church Road, both of Titusville, N.J.
Filed Jan. 19, 1959, Ser. No. 787,502
3 Claims. (Cl. 209—121)

This invention relates to means for handling eggs in the candling, cleaning, grading or other operation to which eggs are frequently subjected. The invention is directed particularly to means by which such operations can be coordinated and the injury to eggs being handled can be reduced to a minimum.

Practically all eggs sold commercially today are candled to eliminate those eggs which are cracked or checked and those which have blood spots or are otherwise inferior. The candling is usually performed before cleaning or grading the eggs to avoid unnecessary handling of inferior eggs and to eliminate the danger of breaking eggs during the handling operations. In candling eggs, the operation may be performed by hand, in which case the eggs are held in front of a light for examination, after which the high quality eggs are placed on an inclined track which leads to the cleaning, grading or other egg handling equipment. In the alternative, the eggs may be placed on an inclined track leading to the equipment and are candled as they roll along the track over a light located beneath the track.

The speed at which the eggs are candled depends, of course, upon the skill and ability of the candler and varies considerably depending upon the experience of the candler. Even the same candler may operate more rapidly at one time than another. Thus, while cleaning, grading and other types of egg handling equipment driven by motors can be operated at a constant speed and thereby coordinated, the speed at which eggs are candled is subject to wide variation. As a result, the inclined tracks along which the eggs move may be overloaded with eggs at one time and may be practically empty at another time.

It is important to avoid any checking or cracking of eggs after they have been candled in order to assure a uniform quality of product. However, if the inclined tracks along which the eggs roll are nearly empty, the eggs will roll a considerable distance and gain speed in their movement before engaging other eggs or stop means. As a result, eggs placed on a nearly empty inclined track may be checked or cracked during their movement from the candler to the cleaner or from one piece of equipment to another. Similarly, if the eggs should be crowded on the inclined track, they may jam or be broken or cracked.

A further problem arises when eggs are fed at different rates to egg handling equipment since the effectiveness of a cleaner may be quite different when it acts on single eggs as compared with its operation on six or eight eggs at a time. Similarly egg graders are more accurate in operation when driven at a constant or predetermined speed. Therefore, egg handling assemblies wherein the eggs are progressively candled, cleaned and graded present difficult problems in assuring the regular and adequate flow of eggs through the assembly.

In accordance with the present invention, the movement of eggs along inclined tracks from a candler to egg handling equipment or from one piece of equipment to another is controlled in such a way as to maintain the tracks or channels properly filled with eggs, whereby cracking or injury to eggs during movement is materially reduced. This result is preferably attained by providing control means readily available to the candler for varying the speed of operation of the equipment adjacent the candler to coordinate the operation of the equipment with the ability or speed of the candler. Further, the assembly preferably also is provided with means for controlling or regulating the movement of eggs along inclined tracks from one piece of equipment to another and for controlling the operation of the elements of the assembly.

Accordingly, the principal object of the present invention is to control the movement of eggs along inclined tracks to egg handling equipment.

A further object of the invention is to provide means for varying the speed of operation of automatic egg handling equipment to assure a substantially uniform supply of eggs to inclined tracks or other elements employed with such equipment.

Another object of the invention is to provide means for varying the speed of operation of egg handling equipment in such a way as to maintain a substantially uniform supply of eggs upon inclined tracks leading to egg handling equipment.

A specific object of the invention is to reduce the danger of eggs being cracked or checked as they move along inclined tracks of egg handling equipment.

Another specific object of the invention is to control various elements in an egg handling assembly in a manner to assure the most effective and accurate operation thereof.

These and other objects and features of the present invention will appear from the following description thereof wherein reference is made to the figures of the accompanying drawing.

Figure 2:
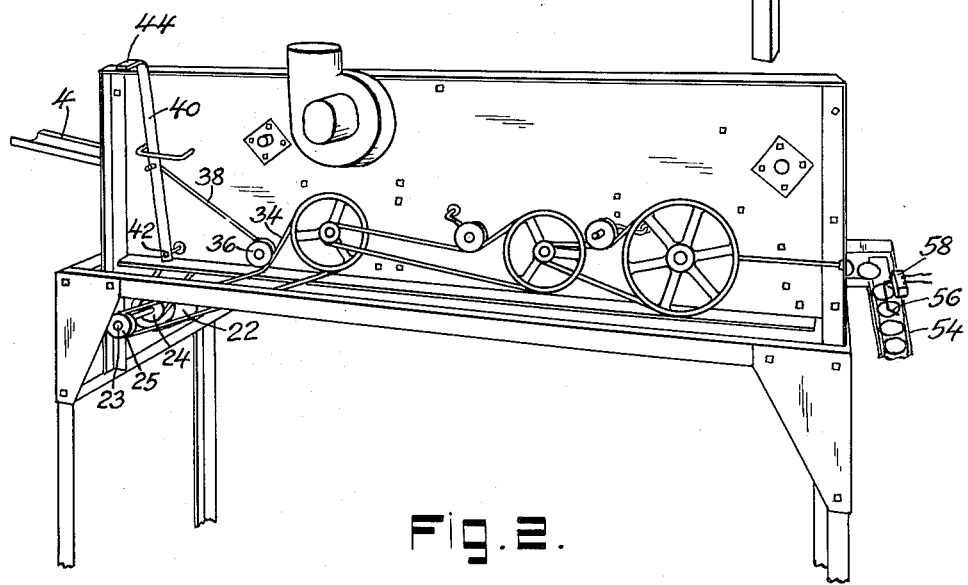
Figure 4:
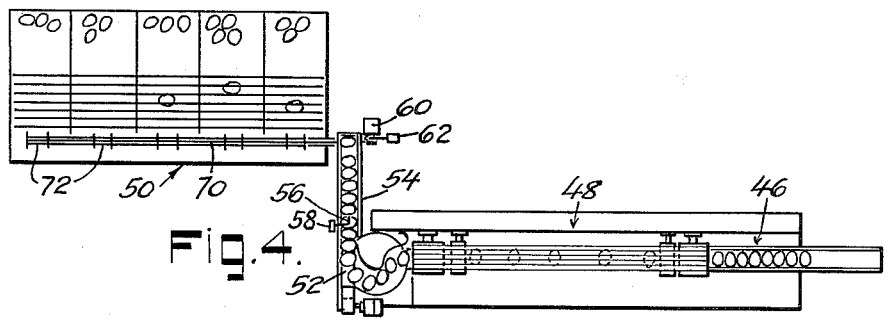
Figure 3:
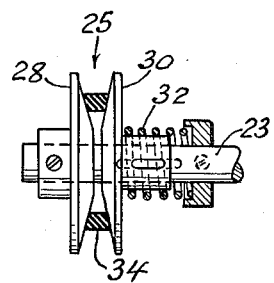
Figure 5:
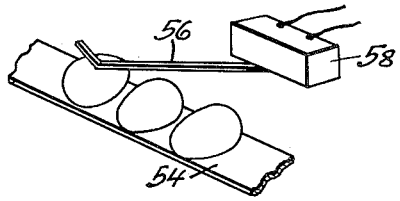
Figure 6:
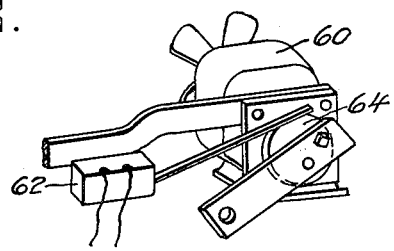
Figure 7:
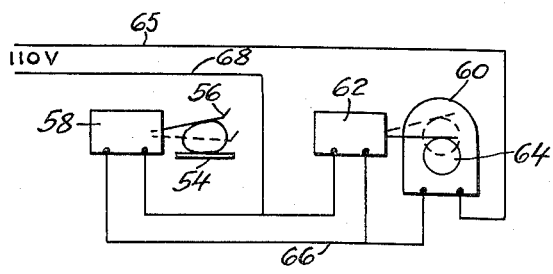

In the drawing:
FIG. 1 is a front elevation showing a typical form of egg candling and egg cleaning equipment embodying the present invention;
FIG. 2 is a rear view of the assembly shown in FIG. 1;
FIG. 3 is a detail view showing a typical speed control means adapted for use in the construction of FIGS. 1 and 2;
FIG. 4 is a diagrammatic plan view of an assembly embodying the construction of FIG. 1 in combination with an egg grader;
FIG. 5 is a perspective showing a detail of the construction of FIG. 4;
FIG. 6 is a perspective illustrating a further detail of a construction embodied in the assembly of FIG. 4, and
FIG. 7 is a wiring diagram illustrating a type of circuit arrangement which may be employed in the assembly of FIG. 4.

In that form of the invention chosen for purposes of illustration in FIGS. 1, 2 and 3, an egg cleaner of the general type shown and described in the issued Patent No. 2,579,604 is indicated at 2 and is provided with an inclined track 4 which extends over a light source 6 so that eggs moving along the track 4 may be candled. The lowermost egg on the track 4 is held in place by a stop member 8 which is movable toward and away from the eggs so as to release one egg at a time from the lower end of the track 4 in order that it may be picked up and carried through the egg cleaning device 2.

As shown, the egg cleaning device embodies a plurality of flexible abrasive bands 10 which pass about the pulleys 12 whereas the eggs 16 are moved along a supporting member 18 by fingers 17 carried by a chain 19. In this way the eggs are moved from the lower end of the inclined track 4 to the discharge end 20 of the egg cleaner. The pulleys 12 and 14 and other elements of the egg cleaning equipment are driven by means of a motor 22 and for this purpose the shaft 23 of the motor is provided with the pulleys 24 and 25. The pulley 24 is of conventional type and drives the belt 26 and the pulleys 12 and 14 whereby the abrasive bands 10 are driven at constant speed at all times. However, the pulley 25 is of the type known as a "Reeves drive" pulley illustrated in FIG. 3 and is composed of two opposing side members 28 and 30 which are urged toward each other by means of a spring 32.

The flexible balt 34 passes around the pulley 25 and a tension member 36 engages the belt 34. The tensioning member 36 is carried by an arm 38 connected to a lever 40 pivotally mounted at 42 on the frame work of the egg cleaner. The effective diameter of the adjustable pulley 25 will vary depending upon the tension applied to the belt 34 by the tensioning member 36. Therefore, the speed at which the chain 19 and fingers 17 remove the eggs from the inclined tracks 4 and carry them along over the supporting member 18 will depend upon the tension applied to the belt 34 by the tensioning member 36. This tension, in turn, is determined by the positioning of the lever 40 and the arm 38 by which the tensioning member is carried. The motor 22 and the abrasive bands 10 may thus be driven at a constant speed such as to assure the most effective cleaning of the eggs.

The upper end of the lever 40 is provided with a handle 44 positioned adjacent the candling means 6 in position to be manipulated. Therefore, in the event the egg cleaning equipment is operated more rapidly than the candler is able to examine the eggs, the number of eggs on the track 4 will be decreased and the track would be emptied if the speed of the egg cleaner were not decreased. The operator can then manipulate the handle 44 to slow down the operation of the egg cleaner and thereby maintain an adequate supply of eggs on the track 4 so as to prevent them from rolling freely or for too great a distance from the egg candler to the egg cleaner. On the other hand, if the candler is working rapidly and the egg cleaner is operating too slowly, the number of eggs on the track 4 becomes excessive. The candler then can manipulate the handle 44 to speed up the operation of the egg candler so that it will remove the eggs from the track 4 more rapidly.

In this way, the egg candler can regulate the speed of the operation of the egg cleaner to correspond to the speed at which he is performing the candling operation. The cleaner will thus be supplied with a full complement of eggs at all times and will not be called upon to clean individual eggs or operate in an irregular manner. Of course, if the eggs are being supplied to a grader instead of an egg cleaner, the speed of operation of the equipment can be varied in the same way by adjustment of the tension applied to the drive belt between the motor driving the equipment and the pulley wheel 25 about which the drive belt 34 passes. However, it is normally preferable to maintain the speed of operation of an egg grader as nearly uniform as possible in order to assure uniform and accurate grading. Accordingly, the operation of the grader is preferably controlled in a manner to establish and maintain a fixed speed even when the rate at which eggs are supplied thereto is varied.

While one typical and preferred form of speed regulating means has been shown in FIGS. 2 and 3, it will be apparent that any other suitable form of speed regulating means may be employed. However, it is desirable to employ a type of speed regulator which is gradually variable from one speed to another, rather than to employ regulating means which increase or decrease the speed by fixed increments. The gradual adjustment in speed of operation of the equipment avoids abrupt loading of the motor and jerky operation of the equipment which might damage the eggs. Furthermore, gradual and continuously variable speed adjusting means render it possible to vary the operation of the candler. Uniformity of operation and coordination of the egg candling and egg handling operations is thus rendered possible.

In that form of the invention illustrated in FIGS. 4 to 7 of the drawing, the assembly embodies an egg candler 46, an egg cleaner 48 and an egg grader 50. The eggs which have been cleaned by the cleaner 48 are passed to the egg grader 50 by means of a conveyor 52 leading to an inclined track 54 which holds the eggs in position to be picked up and moved through the egg grader.

The egg grader may be of any suitable or preferred type such as that shown and described in Patent No. 2,246,597. The track 54 of the egg grader, like the track 4 of FIG. 1, should be supplied with a sufficient number of eggs to avoid free rolling of the eggs for a distance which might be sufficient to cause cracking or checking of the eggs. Therefore, it is important to coordinate the operation of the egg grader with that of the egg cleaner. While it is possible to employ a continuously variable speed control for the egg grader coordinated with that employed on the egg cleaner, such a construction would be expensive and complicated. Moreover, it is found in practice that egg graders tend to vary in operation and are less accurate when driven at differing speeds. Accordingly, it is desirable to operate the egg grader at a fixed predetermined speed but to control the operation of the grader automatically and independently of the speed of the cleaner.

In accordance with the present invention, automatic control of the movement of the eggs from the cleaner to the grader is effected by means of a contact element 56 positioned adjacent the upper end of the inclined track 54 so that it will be engaged by each egg passing along the track and will be held in a raised position by an egg located near the upper end of the track. The contact element 56 as shown in FIG. 5 is movable downward by gravity into position to be engaged by an egg on the track 54. A switch 58 such as a "micro-switch" is positioned to be actuated by the contact member 56 and is arranged to close a circuit including the motor 60 for the grader whenever the element 56 is raised.

In operation, the track 54 of the egg grader is first filled with eggs to be graded. Thereafter, as the assembly is operated, the element 56 is raised and motor 60 will continue to operate as long as a sufficient number of eggs are retained on the track 54 to preclude undesired free rolling of the eggs along the track 54. However, when the number of eggs on the track 54 is reduced and there is no egg in engagement with the contact member 56, the contact will fall and the micro-switch 58 will be actuated to break the motor circuit and stop the operation of the egg grader.

The egg grader is preferably actuated by the motor 60 at a speed which normally serves to grade the eggs at least as rapidly as the maximum speed of operation of the egg cleaner. Then when the eggs are being candled rapidly and the egg cleaner is operating at its maximum speed, the inclined track 54 by which eggs are fed from the egg cleaner to the egg grader will be continuously supplied with a sufficient number of eggs to hold the contact member 56 raised and assure continued operation of the egg grader. The accumulation of excessive eggs on the inclined track 54 cannot occur since the speed of the egg grader is at least equal to the maximum speed of the egg cleaner. On the other hand, if the eggs are being candled relatively slowly and the speed of the egg cleaner is reduced by manipulation of the handle 44 of the variable speed control for the egg cleaner, the number of eggs passing from the egg cleaner to the egg grader will be reduced. The number of eggs received by the track 54 will thus be reduced, whereupon the contact member 56 will be permitted to fall and the operation of the egg grader will be stopped until additional eggs move into engagement with the contact member 56.

During relatively slow candling operations and slow delivery of eggs from the egg cleaner to the egg grader, the egg grader will operate intermittently. However, since it is desirable to avoid any such irregular operation of the egg grader as might result in damage to the eggs, the egg grader is provided with a micro-switch 62 actuated by a cam 64. The cam 64 serves to close the switch 62 to maintain the motor circuit closed until the elements have reached a predetermined idle position in which the egg lifting or forwarding means are spaced from the eggs. Thereafter, when the motor is energized by switch 58, the elements will have an opportunity to attain the desired fixed speed for accurate operation of the grader before the eggs are lifted or forwarded in the grader.

The system, therefore, may include a circuit such as that shown in FIG. 7 wherein the motor 60 for driving the egg grader is supplied with current from the power line 65. When the micro-switch 58 is closed, current flows from the motor 60 through line 66 and switch 58 to the opposite side 68 of the power. However, if microswitch 58 is opened because of an insufficient supply of eggs on track 54, the motor will be controlled by switch 62 and cam 64 so as to continue to operate until the elements have reached the desired idle position. Under such circumstances, current will flow from the power line 65 through the motor and closed micro-switch 62 to the opposite side 68 of the power line. However, the cam 64 will move to open the micro-switch and break the motor circuit when the elements approach their idle position.

In the construction shown, the egg grader is of the type shown and described in our Patent No. 2,246,597 and includes an egg transfer bar 70 which is movable in an elliptical path to engage and lift the foremost egg on the track 54 and transfer it to the first of a series of egg weighing scales 72. The cam 64 and micro-switch 62 are, therefore, arranged to assure the breaking of the motor circuit when the egg conveying bar 70 is in a lowered idle position. In this way, the egg conveying bar of the egg grader will be located out of contact with the eggs when it comes to rest by reason of the actuation of the switches 58 and 62. When the motor 60 is again energized by operation of the contact member 56 and switch 58, the egg conveying bar and other elements of the egg grader will move through a substantial distance before engaging any of the eggs. The motor 60 will accordingly be given sufficient time to attain a constant speed assuring smooth, uniform operation of the egg grader.

The construction thus provided not only serves to coordinate the operation of the egg cleaner and the egg grader, but further serves to permit continuous adjustment and regulation in the operation of each of a plurality of egg handling devices by the egg candler in a manner to adjust the entire operation to the speed at which the eggs are being candled. At the same time, the eggs are prevented from rolling freely along the inclined egg tracks a distance sufficient to cause checking or cracking of the eggs whereas the egg cleaner is adequately charged with eggs so as to assure uniform cleaning thereof while the speed of operation of the egg grader may be established and maintained at the optimum rate for the most accurate grading of the eggs.

While the assembly shown and described embodies a typical and preferred form of egg cleaner, egg grader, variable speed control means and switches it will, of course, be apparent that each or all of the elements described may be varied or rearranged in any particular assembly. In view thereof, it should be understood that the particular construction disclosed is intended to be illustrative only and is not intended to limit the scope of the invention.

We claim:

1. An assembly comprising egg candling means including an inclined track along which eggs being candled are movable by gravity, an egg cleaner having means thereon for removing eggs from said inclined track, means for varying the speed of operation of said egg cleaner to maintain a predetermined supply of eggs on said inclined track, an egg grader, a track to which eggs are supplied by said egg cleaner and from which they are removed by the egg grader, a motor normally actuating said egg grader at a speed serving to remove eggs from said track more rapidly than they are supplied to the track by said egg cleaner, and control means for said motor positioned adjacent said track and responsive to the absence of eggs on said track for interrupting the operation of said motor and egg grader.

2. An assembly comprising egg candling means including an inclined track along which eggs being candled are movable by gravity, an egg cleaner having means thereon for removing eggs from said inclined track, means for varying the speed of operation of said egg cleaner to maintain a predetermined supply of eggs on said inclined track, an egg grader, a track to which eggs are supplied by said egg cleaner and from which they are removed by the egg grader, a motor normally actuating said egg grader at a speed serving to remove eggs from said track more rapidly than they are supplied to the track by said egg cleaner, and control means for said motor positioned adjacent said track and responsive to the absence of eggs on said track for interrupting the operation of said motor and egg grader, the egg grader including an element movable to and from an idle position and means for rendering said motor operative when said element is in idle position.

3. An assembly comprising an egg candling device, an egg grader to which eggs from said candling device are supplied, said egg grader having a series of egg weighing scales, transfer means for moving eggs from one of said scales to another, a motor connected to the transfer means and operable to move the transfer means from an egg engaging position to an idle position, a track along which eggs from the egg candling device are movable to the egg grader, and means responsive to the absence of eggs on said track for stopping said motor when the transfer means is in said idle position.

References Cited in the file of this patent

UNITED STATES PATENTS

| | | |
|---|---|---|
| 1,799,106 | Laxo | Mar. 31, 1931 |
| 1,911,650 | Smith | May 30, 1933 |
| 1,916,255 | Cabot | July 4, 1933 |
| 1,942,555 | Kimball et al. | Jan. 9, 1934 |
| 2,579,602 | Niederer et al. | Dec. 25, 1951 |
| 2,579,603 | Niederer et. al. | Dec. 25, 1951 |
| 2,579,604 | Niederer et al. | Dec. 25, 1951 |
| 2,843,250 | Niederer et al. | July 15, 1958 |